US012728617B2

(12) United States Patent
Lanfant et al.

(10) Patent No.: US 12,728,617 B2
(45) Date of Patent: Sep. 8, 2026

(54) METHOD FOR MANUFACTURING AN ACOUSTIC ATTENUATION STRUCTURE WITH CONTROL OF THE POSITIONING OF AN ACOUSTIC SKIN

(71) Applicant: SAFRAN, Paris (FR)

(72) Inventors: Nicolas Pierre Lanfant, Moissy-Cramayel (FR); Hugues Laurent Alglave, Moissy-Cramayel (FR); Patrick Dunleavy, Moissy-Cramayel (FR)

(73) Assignee: SAFRAN, Paris (FR)

(*) Notice: Subject to any disclaimer, the term of this patent is extended or adjusted under 35 U.S.C. 154(b) by 203 days.

(21) Appl. No.: 18/578,231

(22) PCT Filed: Jul. 5, 2022

(86) PCT No.: PCT/FR2022/051341
§ 371 (c)(1),
(2) Date: Jan. 10, 2024

(87) PCT Pub. No.: WO2023/285749
PCT Pub. Date: Jan. 19, 2023

(65) Prior Publication Data

US 2024/0316894 A1 Sep. 26, 2024

(30) Foreign Application Priority Data

Jul. 15, 2021 (FR) ...................................... 2107652

(51) Int. Cl.
*B32B 3/26* (2006.01)
*B32B 3/12* (2006.01)
(Continued)

(52) U.S. Cl.
CPC ................ *B32B 3/12* (2013.01); *B32B 3/266* (2013.01); *B32B 27/08* (2013.01); *B32B 27/281* (2013.01);
(Continued)

(58) Field of Classification Search
CPC ........... B32B 3/12; B32B 3/266; B32B 27/08; B32B 27/281; B32B 27/285;
(Continued)

(56) References Cited

U.S. PATENT DOCUMENTS

| | | | | |
|---|---|---|---|---|
| 5,912,442 | A | 6/1999 | Nye et al. | |
| 9,783,316 | B2 * | 10/2017 | Alonso-Miralles .... | B64D 33/06 |

(Continued)

FOREIGN PATENT DOCUMENTS

| | | | |
|---|---|---|---|
| EP | 3660295 | A1 | 1/2021 |
| EP | 3696090 | A1 | 5/2021 |

(Continued)

OTHER PUBLICATIONS

Search Report and Written Opinion issued in International Application No. PCT/FR2022/051341, mailed on Oct. 25, 2022.

(Continued)

*Primary Examiner* — Forrest M Phillips
(74) *Attorney, Agent, or Firm* — Bookoff McAndrews, PLLC

(57) ABSTRACT

A method for manufacturing an acoustic attenuation structure including the following steps: making a complex acoustic multi-element panel including a plurality of hollow complex acoustic elements and a plurality of partitions forming acoustic cavities, each complex acoustic element being housed in an acoustic cavity so as to form an acoustic cell, making a first skin, piercing a plurality of perforations on the first skin at determined locations to form a multi-perforated acoustic skin, assembling the complex acoustic (Continued)

multi-element panel with the multi-perforated acoustic skin. The multi-perforated acoustic skin including on its assembly face a plurality of positioning studs configured to cooperate with a hollow complex acoustic element or an acoustic cavity during the assembly of the complex acoustic multi-element panel with the multi-perforated acoustic skin.

12 Claims, 4 Drawing Sheets

(51) Int. Cl.

| | |
|---|---|
| ***B32B 27/08*** | (2006.01) |
| ***B32B 27/28*** | (2006.01) |
| ***B32B 27/38*** | (2006.01) |
| ***F02K 1/82*** | (2006.01) |

(52) U.S. Cl.
CPC .......... *B32B 27/285* (2013.01); *B32B 27/288* (2013.01); *B32B 27/38* (2013.01); *B32B 2307/102* (2013.01); *F02K 1/827* (2013.01); *F05D 2260/96* (2013.01)

(58) Field of Classification Search
CPC . B32B 27/255; B32B 27/38; B32B 2307/102; F02K 1/827; F05D 2260/96
USPC .......................................................... 181/222
See application file for complete search history.

(56) References Cited

U.S. PATENT DOCUMENTS

| | | | | |
|---|---|---|---|---|
| 11,668,236 | B2 * | 6/2023 | Wood | B32B 3/12 181/292 |
| 11,911,873 | B2 * | 2/2024 | Simpson | B32B 5/024 |
| 2013/0186707 | A1 | 7/2013 | Richter | |
| 2015/0027629 | A1 | 1/2015 | Butler et al. | |

FOREIGN PATENT DOCUMENTS

| | | | |
|---|---|---|---|
| FR | 3082987 | A1 | 9/2020 |
| GB | 2314526 | A | 11/1999 |
| JP | H0830277 | A | 4/2001 |
| WO | 2016046494 | A1 | 3/2016 |

OTHER PUBLICATIONS

Search Report issued in French Application No. 2107652, mailed Mar. 15, 2022.

* cited by examiner

[Fig. 1]
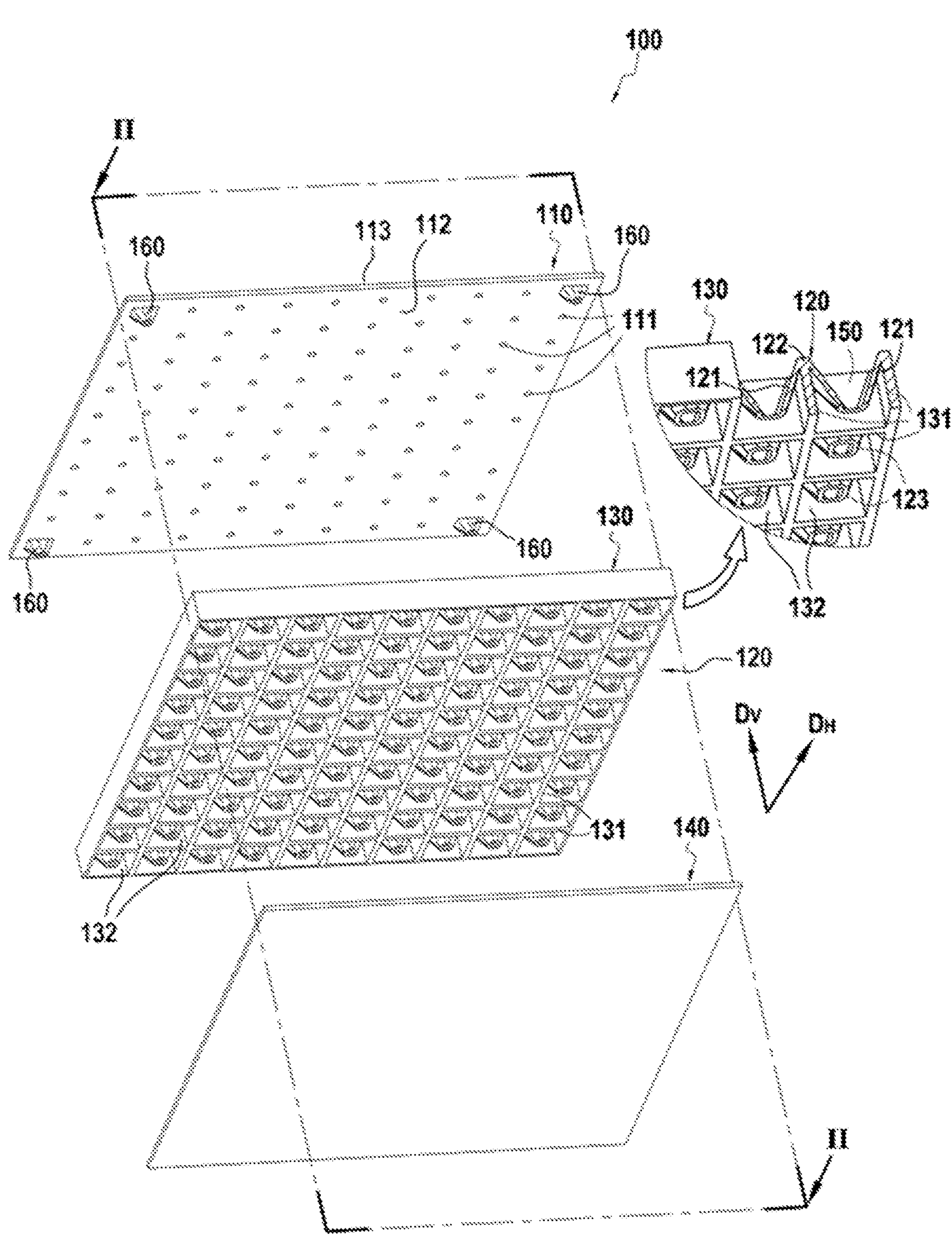

[Fig. 2]
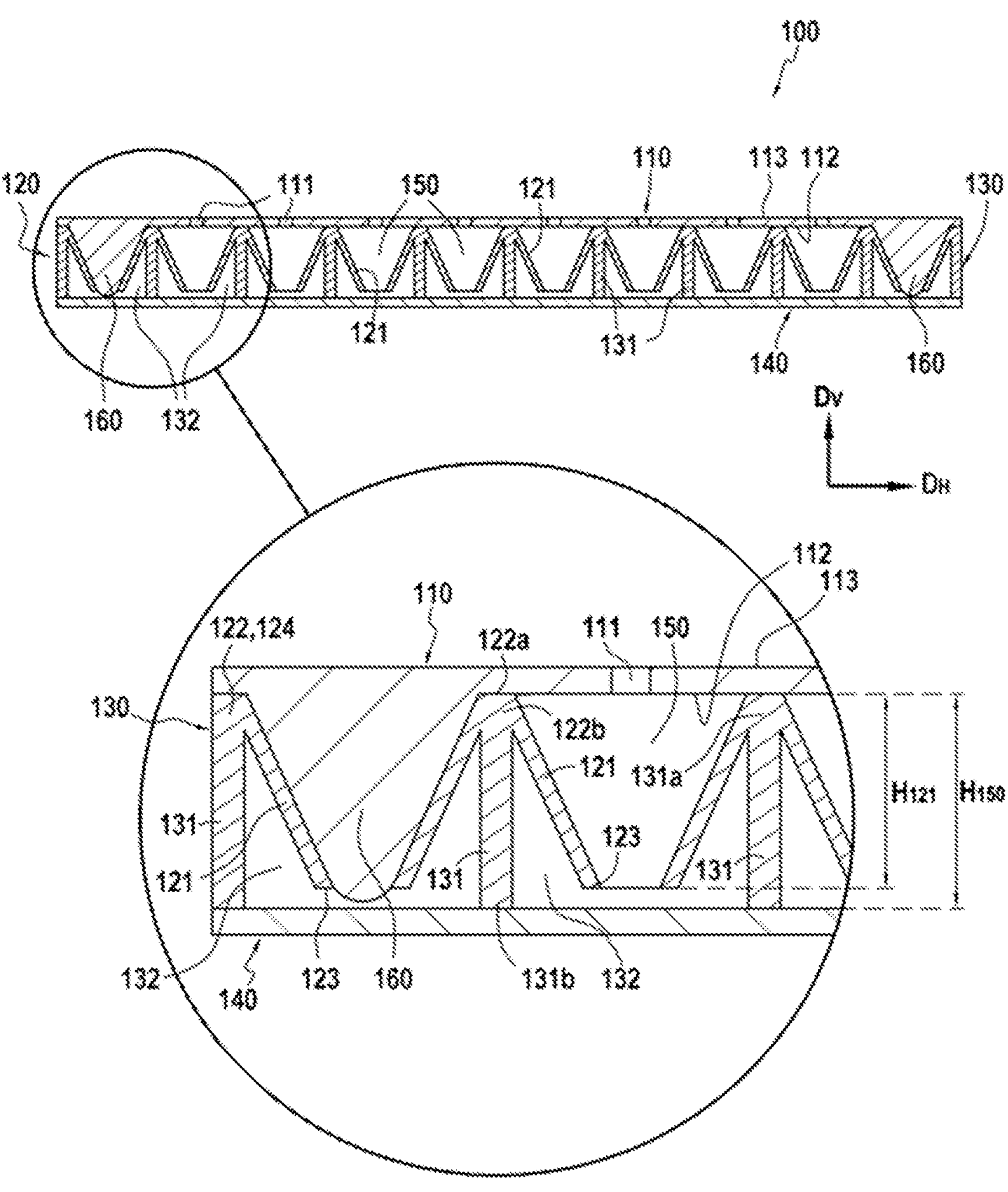

[Fig. 3]
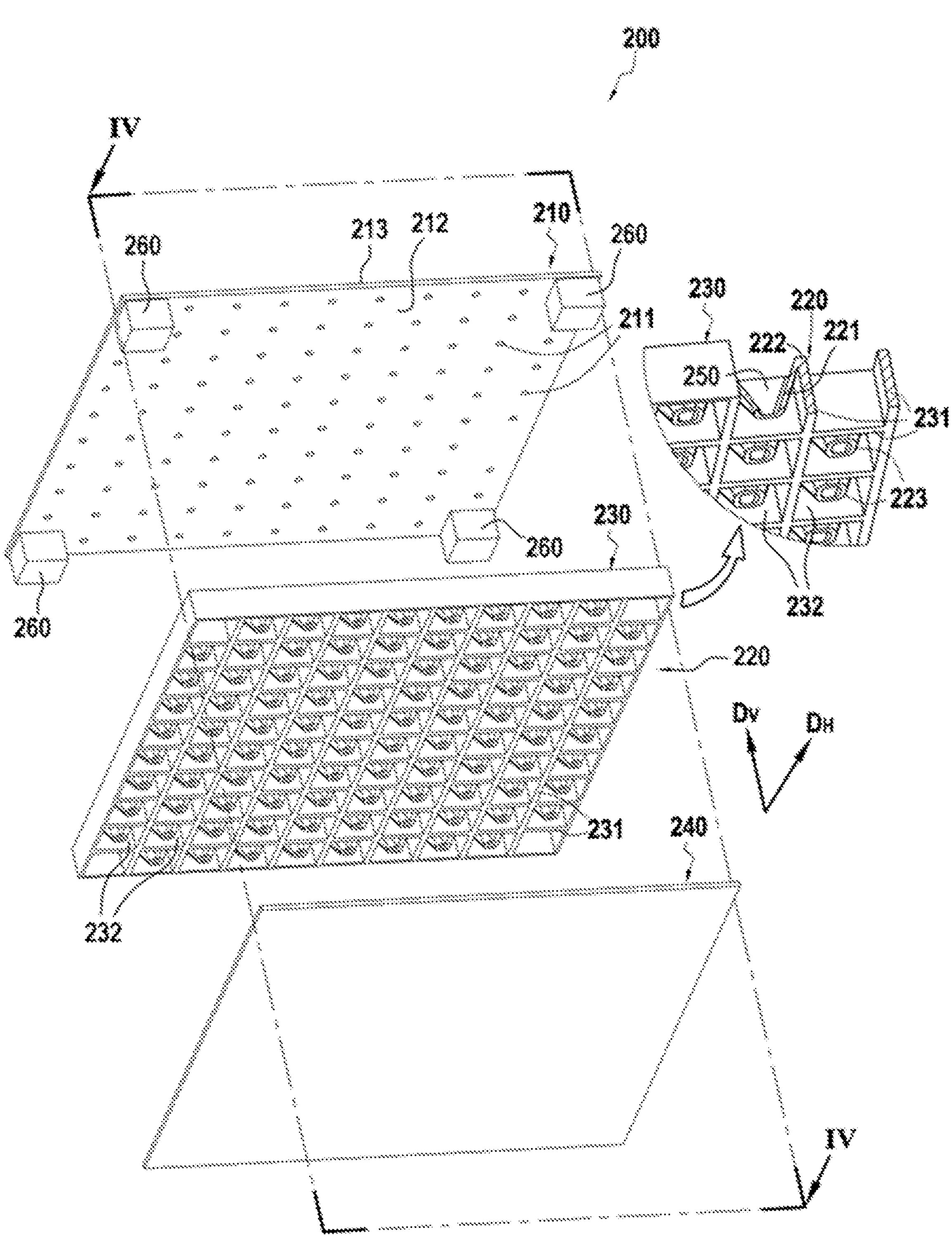

[Fig. 4]
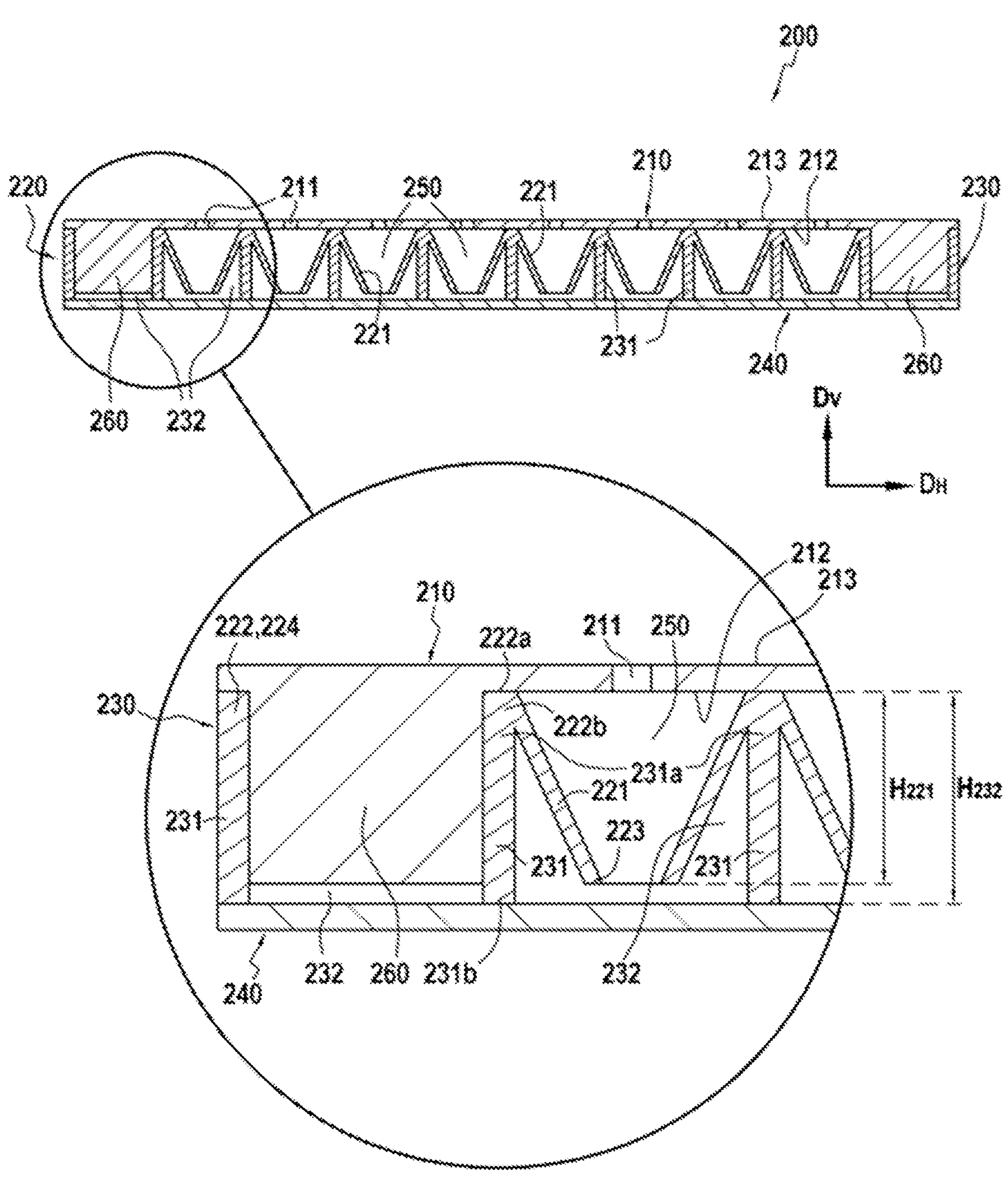

METHOD FOR MANUFACTURING AN ACOUSTIC ATTENUATION STRUCTURE WITH CONTROL OF THE POSITIONING OF AN ACOUSTIC SKIN

CROSS-REFERENCE TO RELATED APPLICATIONS

This is a National Stage Application under 35 U.S.C. § 371 of International Application No. PCT/FR2022/051341, filed Jul. 5, 2022, now published as WO 2023/285749 A1, which claims priority to French Patent Application No. 2107652, filed on Jul. 15, 2021.

TECHNICAL FIELD

The present invention relates to the general field of acoustic attenuation structures or panels. It concerns more particularly the acoustic attenuation structures used to reduce the noise produced in aircraft engines as in gas turbines or exhaust thereof.

PRIOR ART

The acoustic attenuation structures are typically constituted by an acoustic surface plate or skin permeable to the acoustic waves to be attenuated and by a full reflective plate or skin called "closing plate", a cellular body such as a honeycomb or a porous structure being disposed between these two walls. In a well-known manner, such panels form Helmholtz type resonators which make it possible to attenuate the acoustic waves in a certain frequency range. Acoustic attenuation structures of this type are in particular described in documents U.S. Pat. No. 5,912,442 and GB 2 314 526.

These acoustic attenuation structures are limited to simple cell shapes such as those of the alveoli of a conventional NIDA® type structure. Consequently, the acoustic performances obtained are limited to the absorption of a very narrow frequency range.

One solution to increase the acoustic attenuation frequency range is to superimpose two cellular bodies with different shapes and dimensions of cells. This solution has the disadvantage of significantly increasing the bulk of the acoustic attenuation structure.

Another known solution consists in placing open truncated cones in alveoli as described in document FR 3 082 987. If this solution makes it possible to reduce the bulk of the acoustic attenuation structure, its manufacture proves to be delicate in the case of the use of a multi-perforated acoustic skin. In this case, a plurality of perforations is made in the skin in order to allow the sound waves to be attenuated to penetrate the cells of the structure. The perforations can be made after assembly of the acoustic skin with a simple honeycomb-type cellular body. On the other hand, in the case of the use of an acoustic attenuation panel comprising complex acoustic cells such as for example truncated cones housed in alveoli, the piercing of the acoustic skin cannot be carried out after assembly without the risk of damaging the truncated cones or other elements housed in the alveoli. Indeed, it cannot be envisaged to interrupt the stroke of the piercing tool (e.g. drill) immediately upon exiting the skin because the piercing would not be clean when exiting the skin, which would penalize the acoustic performance of the structure.

Consequently, in the case of manufacture of an acoustic attenuation structure comprising complex acoustic cells, it is therefore preferable to pierce the acoustic skin before its assembly with the acoustic attenuation panel. However, in this case, a significant difficulty remains regarding the accurate positioning of the multi-perforated acoustic skin with the acoustic attenuation panel. Indeed, it is very important that the perforations of the acoustic skin open out into the cavities delimited by the complex acoustic cells and not onto solid portions of the panel such as the edges of the cells so as not to penalize the acoustic performance of the structure. On acoustic attenuation structures of large dimension, a small local alignment offset of the acoustic skin can lead at the end of the part to significant misalignments between the perforations and the cavities of the acoustic cells.

Furthermore, when perforations open out onto the solid portions of the panel due to misalignment, these perforations become blind holes which are both acoustically useless and aerodynamically harmful because they cause an increase in the drag of the acoustic skin.

DISCLOSURE OF THE INVENTION

The main aim of the present invention is therefore to propose an acoustic attenuation structure which does not present the aforementioned drawbacks.

In accordance with the invention, this aim is achieved thanks to a method for manufacturing an acoustic attenuation structure comprising the following steps:

- making a complex acoustic multi-element panel comprising a plurality of hollow complex acoustic elements each having a shape gradually narrowing between a base and a top and a plurality of partitions forming acoustic cavities, each complex acoustic element being housed in an acoustic cavity so as to form an acoustic cell,
- making a first skin,
- piercing a plurality of perforations on the first skin at determined locations so as to form a multi-perforated acoustic skin,
- assembling a face of the complex acoustic multi-element panel with an assembly face of the multi-perforated acoustic skin, characterized in that the multi-perforated acoustic skin comprises on its assembly face a plurality of positioning studs present at determined locations, each positioning stud being configured to cooperate with a hollow complex acoustic element or an acoustic cavity during the assembly of the complex acoustic multi-element panel with the multi-perforated acoustic skin and in that one or several positioning studs have a shape complementary to the inner shape of the hollow complex acoustic elements.

Thanks to the method of the invention, it is possible to make the perforations in the acoustic skin before its assembly with the other elements of the structure, thus allowing complete and homogeneous piercing of the skin, while ensuring accurate positioning of the perforations relative to the acoustic cells of the complex acoustic multi-element panel during the assembly of the acoustic skin with said panel.

According to a first particular aspect of the method of the invention, one or several positioning studs have a shape complementary to the shape of the acoustic cavities.

According to a second particular aspect of the method of the invention, the acoustic attenuation structure further comprises the assembly of the face of the complex acoustic multi-element panel opposite to the face covered by the multi-perforated acoustic skin with an assembly face of a closing skin.

According to a third particular aspect of the method of the invention, at least one positioning stud comprises a fixing member. The reserve of material constituted by the positioning studs is advantageously used as a holding base for fixing members which can in particular participate in fixing the acoustic attenuation structure.

According to a fourth particular aspect of the method of the invention, the complex acoustic elements have a pyramidal, conical or spiral shape.

According to a fifth particular aspect of the method of the invention, at least the complex acoustic multi-element panel is made of a filled or unfilled thermoplastic or thermosetting material. This makes it possible to control the overall mass of the structure because the complex acoustic elements can be formed by injection and have very thin thicknesses.

According to a sixth particular aspect of the method of the invention, the complex acoustic multi-element panel is made by injection-compression of a filled or unfilled thermoplastic or thermosetting material. The injection-compression makes it possible to further reduce the wall thickness of the complex acoustic elements.

According to a seventh particular aspect of the method of the invention, each positioning stud is manufactured with the acoustic skin by thermoplastic stamping-overmolding or stamping with metal inserts.

According to an eighth particular aspect of the method of the invention, the positioning studs and the acoustic skin are made of a thermoplastic material, each positioning stud being added by welding or by bonding onto said skin.

According to a ninth particular aspect of the method of the invention, each positioning stud is made by additive manufacturing.

According to a tenth particular aspect of the method of the invention, the complex acoustic multi-element panel and the plurality of partitions are made in a single piece by injection of a filled or unfilled thermoplastic or thermosetting material. The manufacture of the acoustic attenuation structure is here greatly simplified because the complex acoustic elements are already positioned relative to the partitions.

The invention also relates to an acoustic attenuation structure comprising:

- a complex acoustic multi-element panel comprising a plurality of hollow complex acoustic elements each having a shape gradually narrowing between a base and a top and a plurality of partitions forming acoustic cavities, each complex acoustic element being housed in an acoustic cavity so as to form an acoustic cell,
- a multi-perforated acoustic skin comprising a plurality of perforations, said acoustic skin having an assembly face fixed on a face of the complex acoustic multi-element panel, characterized in that the multi-perforated acoustic skin comprises on its assembly face a plurality of positioning studs present at determined locations, each positioning stud cooperating with a hollow complex acoustic element or an acoustic cavity of the complex acoustic multi-element panel and in that one or several positioning studs have a shape complementary to the inner shape of the hollow complex acoustic elements.

BRIEF DESCRIPTION OF THE DRAWINGS

FIG. 1 is an exploded schematic perspective view of an acoustic attenuation structure according to one embodiment of the invention, FIG. 2 is a schematic sectional view of the acoustic attenuation structure of FIG. 1 once assembled, FIG. 3 is an exploded schematic perspective view of an acoustic attenuation structure according to another embodiment of the invention, FIG. 4 is a schematic sectional view of the acoustic attenuation structure of FIG. 3 once assembled.

DESCRIPTION OF THE EMBODIMENTS

FIGS. 1 and 2 represent an acoustic attenuation structure 100 in accordance with one embodiment of the invention. The acoustic attenuation structure 100 here comprises an acoustic skin or plate 110, a complex acoustic multi-element panel 120 and a closing skin or plate 140.

The closing skin 140 corresponds to a solid surface intended to reflect the sound waves entering the acoustic attenuation structure. The closing skin can be a constituent element of the acoustic attenuation structure as in the example described here or correspond to a structure of an object, for example an aircraft engine. In the latter case, the acoustic attenuation structure of the invention does not include a closing skin and is directly mounted on the structure of the object.

In the exemplary embodiment described here, the complex acoustic multi-element panel 120 is formed in a single piece which extends in length and width along a horizontal direction $D_H$ and in height along a vertical direction $D_V$. The complex acoustic multi-element panel comprises a plurality of hollow complex acoustic elements 121 each having a shape gradually narrowing between a base 122 and a top 123. In the example described here, the hollow complex acoustic elements 121 have a pyramidal shape. The base 122 of each hollow complex acoustic element 121 is in continuous contact with the base of the adjacent complex acoustic elements so as to form a continuous network of edges 124.

The complex acoustic multi-element panel 120 further comprises a plurality of partitions 131 formed by a network of ribs 130 which forms a plurality of acoustic cavities 132. Each hollow complex acoustic element 121 is housed in an acoustic cavity 132. The upper edge 131*a* of the partitions 131 extends from the lower portion 122*b* of the bases 122 of the hollow complex acoustic elements 121 along the vertical direction $D_V$ (FIG. 2). In this embodiment, the complex acoustic multi-element panel is formed in a single piece with the plurality of partitions, which makes it possible to overcome possible positioning problems between the hollow complex acoustic elements and the plurality of partitions. According to one variant of embodiment, the rear skin can be integrated into the acoustic multi-element panel-partitions assembly by polymer or composite additive manufacturing.

The complex acoustic multi-element panel 120 comprises a plurality of acoustic cells 150 each formed by a hollow complex acoustic element 121 and the partitions 131 surrounding it.

The complex acoustic multi-element panel 120 includes a first assembly face constituted here by the upper portion 122*a* of the bases 122 of the hollow complex acoustic elements 121 corresponding to the exposed surface of the edges 124, this first assembly face being intended to be assembled with the acoustic skin 110. The complex acoustic multi-element panel 120 further includes a second assembly face constituted here by the lower edge 131*b* of the partitions 131.

The acoustic skin 110 has the function of allowing the sound waves to be attenuated to pass inside the acoustic attenuation structure 100. For this purpose, the acoustic skin 110 comprises a plurality of perforations 111. The acoustic skin 110 includes an assembly face 112 opposite to an outer face 113 and intended to be placed facing the complex acoustic multi-element panel 120.

In accordance with the invention, the perforations 111 are made by piercing in the skin 110 before its assembly with the complex acoustic multi-element panel 120. This makes it possible to pierce the acoustic skin right through without the risk of damaging the complex acoustic elements. The perforations 111 are made on the skin 110 at determined locations so as to open out into the free internal volume of the acoustic cells 150 and not on the edges 124 of the complex acoustic multi-element panel 120 once the acoustic skin 110 is assembled with said complex acoustic multi-element panel. One or several perforations 111 can be aligned with each acoustic cavity 150. The perforations 111 can represent between 5% and 10% of the total surface of the acoustic skin 110. Still in accordance with the invention, the acoustic skin comprises on its assembly face 112 a plurality of positioning studs 160, here four in number. The number of positioning studs is at least two in order to allow accurate positioning of the acoustic skin with the complex acoustic multi-element panel. The positioning studs can be manufactured with the acoustic skin for example by thermoplastic stamping-overmolding or stamping with metal inserts. The studs can also be added by welding or by bonding in the case of studs and of a skin made of thermoplastic material. The studs can still be formed by additive manufacturing. The studs can be metallic, made of filled or unfilled thermoplastic or thermosetting matrix composite material. The studs are not necessarily solid.

The positioning studs are preferably positioned on the acoustic skin for making the perforations by piercing, the studs then serving as a reference for determining the piercing locations. This further increases the positioning accuracy of the perforations. However, there is no departure from the framework of the invention when the positioning studs are placed or formed on the acoustic skin after piercing of the perforations.

In the example described here, the positioning studs 160 have a shape complementary to the inner shape of the hollow complex acoustic elements 121. The studs can also have a shape that is not complementary to the inner shape of the hollow complex acoustic elements but which is able to cooperate with these elements to allow good positioning. For example, spherical studs can be easily centered in hollow elements of conical or pyramidal shape.

During the assembly of the assembly face 112 of the acoustic skin 110 with the first assembly face constituted by the upper portion 122*a* of the bases 122 of the complex acoustic elements 121, the positioning studs 160 cooperate with the hollow complex acoustic elements 121 in order to facilitate the positioning of the acoustic skin 110 relative to the complex acoustic multi-element panel 120 and thus ensure perfect alignment of the perforations 111 with the free internal volume of the acoustic cells 150 (FIG. 2).

The acoustic skin 110 is fixed, by bonding or welding, on the upper portion 122*a* of the bases 122 of the complex acoustic elements 121 corresponding to the exposed surface of the edges 124 while the closing skin 140 is fixed, for example by bonding or welding, on the lower edge 131*b* of the partitions 131.

The height $H_{121}$ of the complex acoustic elements 121 is smaller than the height $H_{150}$ of the acoustic cavities 132. More specifically, the height $H_{121}$ of the complex acoustic elements is comprised between 10% and 99% of the height $H_{132}$ of the acoustic cavities along the vertical direction.

FIGS. 3 and 4 represent another embodiment of an acoustic attenuation structure of the invention which differs from the structure illustrated in FIGS. 1 and 2 in that the positioning studs cooperate with acoustic cavities as explained in details below.

The acoustic attenuation structure 200 here comprises an acoustic skin or plate 210, a complex acoustic multi-element panel 220 and a closing skin or plate 240.

The closing skin 240 corresponds to a solid surface intended to reflect the sound waves entering the acoustic attenuation structure. The closing skin can be a constituent element of the acoustic attenuation structure as in the example described here or correspond to a structure of an object, for example an aircraft engine. In the latter case, the acoustic attenuation structure of the invention does not include a closing skin and is directly mounted on the structure of the object.

In the exemplary embodiment described here, the complex acoustic multi-element panel 220 is formed in a single piece which extends in length and width along a horizontal direction $D_H$ and in height along a vertical direction $D_V$. The complex acoustic multi-element panel comprises a plurality of hollow complex acoustic elements 221 each having a shape gradually narrowing between a base 222 and a top 223. In the example described here, the hollow complex acoustic elements 221 have a pyramidal shape. The base 222 of each hollow complex acoustic element 221 is in continuous contact with the base of the adjacent complex acoustic elements so as to form a continuous network of edges 224.

Still in the example described here, the complex acoustic multi-element panel 220 is devoid of hollow complex acoustic elements 221 at determined locations of the panel in order to allow the cooperation of acoustic cavities with positioning studs as explained below.

The complex acoustic multi-element panel 220 further comprises a plurality of partitions 231 formed by a network of ribs 230 which forms a plurality of acoustic cavities 232. Each hollow complex acoustic element 221 is housed in an acoustic cavity 232. The upper edge 231*a* of the partitions 131 extends from the lower portion 222*b* of the bases 222 of the hollow complex acoustic elements 221 along the vertical direction $D_V$ (FIG. 4). In this embodiment, the complex acoustic multi-element panel is formed in a single piece with the plurality of partitions, which makes it possible to overcome possible positioning problems between the hollow complex acoustic elements and the plurality of partitions.

The complex acoustic multi-element panel 220 comprises a plurality of acoustic cells 250 each formed by a hollow complex acoustic element 221 and the partitions 231 surrounding it.

The complex acoustic multi-element panel 220 includes a first assembly face constituted here by the upper portion 222*a* of the bases 222 of the hollow complex acoustic elements 221 corresponding to the exposed surface of the edges 124, this first assembly face being intended to be assembled with the acoustic skin 210. The complex acoustic multi-element panel 220 further includes a second assembly face constituted here by the lower edge 231*b* of the partitions 231.

The acoustic skin 210 has the function of allowing the sound waves to be attenuated to pass inside the acoustic attenuation structure 200. For this purpose, the acoustic skin 210 comprises a plurality of perforations 211. The acoustic skin 210 includes an assembly face 212 opposite to an outer face 213 and which is intended to be placed facing the complex acoustic multi-element panel 220.

In accordance with the invention, the perforations 211 are made by piercing in the skin 210 before its assembly with the complex acoustic multi-element panel 220. This makes it possible to pierce the acoustic skin right through without the risk of damaging the complex acoustic elements. The perforations 211 are made on the skin 210 at determined locations so as to open out into the free internal volume of the acoustic cells 250 and not on the edges 224 of the complex acoustic multi-element panel 220 once the acoustic skin 210 is assembled with said complex acoustic multi-element panel. One or several perforations 211 can be aligned with each acoustic cavity 250. The perforations 211 can represent between 5% and 10% of the total surface of the acoustic skin 210.

Still in accordance with the invention, the acoustic skin comprises on its assembly face 212 a plurality of positioning studs 260, here four in number. The number of positioning studs is at least two in order to allow accurate positioning of the acoustic skin with the complex acoustic multi-element panel.

In the example described here, the positioning studs 260 have a shape complementary to the inner shape of the acoustic cavities 232. The complex acoustic multi-element panel 220 is devoid of hollow complex acoustic elements 221 at the locations where the positioning studs 260 are intended to cooperate with the acoustic cavities 232.

During the assembly of the assembly face 212 of the acoustic skin 210 with the first assembly face constituted by the upper portion 222*a* of the bases 222 of the complex acoustic elements 221, the positioning studs 260 cooperate with the acoustic cavities 232 in order to facilitate the positioning of the acoustic skin 210 relative to the complex acoustic multi-element panel 220 and thus ensure perfect alignment of the perforations 211 with the free internal volume of the acoustic cells 250 (FIG. 4).

The acoustic skin 210 is fixed, by bonding or welding, on the upper portion 222*a* of the bases 222 of the complex acoustic elements 221 corresponding to the exposed surface of the edges 224 while the closing skin 240 is fixed, for example by bonding or welding, on the lower edge 231*b* of the partitions 231.

The height $H_{221}$ of the complex acoustic elements 221 is smaller than the height $H_{232}$ of the acoustic cavities 232. More specifically, the height $H_{221}$ of the complex acoustic elements is comprised between 10% and 99% of the height $H_{232}$ of the acoustic cavities along the vertical direction.

According to one variant of embodiment, the acoustic skin can be provided with both positioning studs having a shape complementary to the inner shape of the hollow complex acoustic elements such as the studs 160 and positioning studs having a shape complementary to the inner shape of the acoustic cavities such as the studs 260.

According to yet another variant of embodiment, the hollow complex acoustic elements, on the one hand, and the partitions of the complex acoustic multi-element panel, on the other hand, can be made separately and be brought together at the time of assembly of the acoustic attenuation structure.

The acoustic cavities formed by the plurality of partitions and in which the hollow complex acoustic elements are housed can have a square shape as illustrated in FIGS. 1 and 3 or any other shape suitable for acoustic treatment such as for example a alveolus (hexahedral) shape of the honeycomb type.

The acoustic attenuation structure can have a planar shape as illustrated in FIGS. 1 to 4 or a curved shape having a single or multiple curvature.

One or several positioning studs can further be advantageously used as a holding support for a fixing member making it possible to fix the acoustic attenuation structure on a part of an engine such as for example a fan casing of a gas turbine engine.

The complex acoustic multi-element panel is made by injection of a filled or unfilled thermoplastic or thermosetting material. The manufacture by injection makes it possible to control the overall mass of the structure because the complex acoustic elements can be formed with very thin thicknesses, for example of the order of 1 mm.

According to one particular characteristic of the method of the invention, the complex acoustic multi-element panel is made by injection-compression of a filled or unfilled thermoplastic or thermosetting material. The injection-compression consists in injecting the material into a half-open mold. Thus, even if the material freezes, the channels are less obturated. When the material is distributed throughout the mold, the latter is completely closed (by a closing force) to return to the correct side. This makes it possible to obtain thinner wall thicknesses for the complex acoustic multi-element panel than with a conventional injection method. The injection-compression makes it possible to obtain wall thicknesses in complex acoustic multi-element panels comprised between 0.1 mm and 0.5 mm.

The thermoplastic materials which can be used for the injections described above are in particular polyaryletherketones (PAEK) such as polyetheretherketone (PEEK) and polyetherketoneketone (PEKK).

The thermosetting materials that can be used for the injections described above are in particular epoxide or polybismaleimides (BMI).

The plurality of partitions, the closing skin as well as the assemblies bringing together in a single piece the plurality of partitions and the complex acoustic multi-element panel or the plurality of partitions and one of the skins can also be made by injection of a filled or unfilled thermoplastic or thermosetting material. The plurality of partitions can also be obtained by using a honeycomb structure for example made of aluminum or Nomex®.

The invention claimed is:

1. A method for manufacturing an acoustic attenuation structure comprising:

making a complex acoustic multi-element panel comprising a plurality of hollow complex acoustic elements each having a shape gradually narrowing between a base and a top and a plurality of partitions forming acoustic cavities, each complex acoustic element being housed in an acoustic cavity so as to form an acoustic cell, making a first skin, piercing a plurality of perforations on the first skin at determined locations so as to form a multi-perforated acoustic skin, assembling a face of the complex acoustic multi-element panel with an assembly face of the multi-perforated acoustic skin, wherein the multi-perforated acoustic skin comprises on its assembly face a plurality of positioning studs present at determined locations, each positioning stud being configured to cooperate with a hollow complex acoustic element or an acoustic cavity during the assembly of the complex acoustic multi-element panel with the multi-perforated acoustic skin and in that one or several positioning studs have a shape complementary to an inner shape of the hollow complex acoustic elements.

2. The method according to claim 1, wherein one or several positioning studs have a shape complementary to the shape of the acoustic cavities.

3. The method according to claim 1, wherein the acoustic attenuation structure further comprises the assembly of the face of the complex acoustic multi-element panel) opposite to the face covered by the multi-perforated acoustic skin with an assembly face of a closing skin.

4. The method according to claim 1, wherein at least one positioning stud comprises a fixing member.

5. The method according to claim 1, wherein the complex acoustic elements have a pyramidal, conical or spiral shape.

6. The method according to claim 1, wherein at least the complex acoustic multi-element panel is made of a filled or unfilled thermoplastic or thermosetting material.

7. The method according to claim 6, wherein at least the complex acoustic multi-element panel is made by injection of a filled or unfilled thermoplastic or thermosetting material.

8. The method according to claim 7, wherein the complex acoustic multi-element panel and the plurality of partitions are made in a single piece by injection of a filled or unfilled thermoplastic or thermosetting material.

9. The method according to claim 1, wherein each positioning stud is manufactured with the acoustic skin by thermoplastic stamping-overmolding or stamping with metal inserts.

10. The method according to claim 1, wherein the positioning studs and the acoustic skin are made of a thermoplastic material, each positioning stud being added by welding or by bonding onto said skin.

11. The method according to claim 1, wherein each positioning stud is made by additive manufacturing.

12. An acoustic attenuation structure comprising:

a complex acoustic multi-element panel comprising a plurality of hollow complex acoustic elements each having a shape gradually narrowing between a base and a top and a plurality of partitions forming acoustic cavities), each complex acoustic element being housed in an acoustic cavity so as to form an acoustic cell, a multi-perforated acoustic skin comprising a plurality of perforations, said acoustic skin having an assembly face fixed on a face of the complex acoustic multi-element panel, wherein the multi-perforated acoustic skin comprises on its assembly face a plurality of positioning studs present at determined locations, each positioning stud cooperating with a hollow complex acoustic element or an acoustic cavity of the complex acoustic multi-element panel and in that one or several positioning studs have a shape complementary to an inner shape of the hollow complex acoustic elements.

* * * * *